(12) United States Patent
Zhang et al.

(10) Patent No.: US 6,721,357 B1
(45) Date of Patent: Apr. 13, 2004

(54) CONSTELLATION GENERATION AND RE-EVALUATION

(75) Inventors: Bo Zhang, Raleigh, NC (US); Sigang Qiu, Raleigh, NC (US); Vedavalli Gomatam Krishnan, Raleigh, NC (US); Xuefeng Jiang, Newark, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/572,860

(22) Filed: May 18, 2000

Related U.S. Application Data

(60) Provisional application No. 60/140,825, filed on Jun. 26, 1999, and provisional application No. 60/140,705, filed on Jun. 24, 1999.

(51) Int. Cl.[7] .................................................. H04L 5/16
(52) U.S. Cl. ........................................ 375/222; 375/296
(58) Field of Search ................................ 375/222, 219, 375/285, 316, 261, 340, 346, 377, 295, 296; 379/93.01

(56) References Cited

U.S. PATENT DOCUMENTS

| | | | |
|---|---|---|---|
| 5,406,583 A | 4/1995 | Dagdeviren et al. | |
| 5,724,393 A | 3/1998 | Dagdeviren et al. | |
| 5,751,741 A | 5/1998 | Voith et al. | 371/37.7 |
| 5,802,111 A | 9/1998 | Diehl et al. | 375/259 |
| 5,822,371 A | 10/1998 | Goldstein et al. | 375/242 |
| 5,825,816 A | 10/1998 | Cole et al. | 375/222 |
| 5,828,695 A | 10/1998 | Webb | 375/219 |
| 5,831,561 A * | 11/1998 | Cai et al. | 341/106 |
| 5,838,268 A | 11/1998 | Frenkel | 341/11 |
| 5,838,724 A | 11/1998 | Cole et al. | 375/222 |
| 5,844,940 A | 12/1998 | Goodson et al. | 375/222 |
| 5,844,944 A | 12/1998 | Betts et al. | 375/298 |
| 5,862,179 A | 1/1999 | Goldstein et al. | 375/242 |
| 5,862,184 A | 1/1999 | Goldstein et al. | 375/295 |
| 6,009,121 A * | 12/1999 | Waldron et al. | 375/254 |
| 6,023,493 A | 2/2000 | Olafsson | 375/354 |
| 6,034,991 A * | 3/2000 | Zhou et al. | 375/222 |
| 6,065,030 A | 5/2000 | Zhang | 708/491 |
| 6,088,334 A | 7/2000 | Davenport et al. | 370/252 |
| 6,178,200 B1 * | 1/2001 | Okunev et al. | 375/222 |
| 6,181,737 B1 | 1/2001 | Okunev et al. | |
| 6,185,249 B1 | 2/2001 | Drucker et al. | |
| 6,327,301 B1 | 12/2001 | Demjanenko et al. | |
| 6,381,266 B1 | 4/2002 | Zhang et al. | |
| 6,480,549 B1 | 11/2002 | Hirzel et al. | |
| 6,523,233 B1 | 2/2003 | Wang et al. | |
| 6,542,551 B1 | 4/2003 | Okunev et al. | |
| 6,549,584 B1 * | 4/2003 | Gatherer et al. | 375/261 |
| 2002/0085629 A1 | 7/2002 | Zhang et al. | |

* cited by examiner

Primary Examiner—Tesfaldet Bocure
(74) Attorney, Agent, or Firm—Blakely, Sokoloff, Taylor & Zafman LLP

(57) ABSTRACT

A method of generating a data constellation at a client modem is provided whereby an optimum distance between data constellation data points may be calculated for a predetermined, acceptable error probability. An iterative process may be carried out using proposed data constellations which may be used to provide factors for calculating corrected constellations. Once a constellation is generated to satisfy the required probability of error, the constellation may be re-evaluated using CRC errors and detected noise variance at the client modem. Based upon predetermined levels of noise variance and CRC error, the constellation may be regenerated to operate at either a higher bit rate or a lower bit rate.

34 Claims, 5 Drawing Sheets

CONSTELLATION GENERATION AND RE-EVALUATION

CROSS-REFERENCE TO RELATED APPLICATIONS

The present application claims priority from Provisional U.S. Patent Application Ser. No. 60/140,705 filed Jun. 24, 1999 and Provisional U.S. Patent Application Ser. No. 60/140,825 filed on Jun. 26, 1999, both of which are incorporated herein by reference.

The subject matter of the present invention is related to that in the following co-pending U.S. Patent Applications:

Ser. No. 09/592,539 filed Jun. 12, 2000 entitled "Digital Impairment Learning Sequence";

Ser. No. 09/592,539 filed Jun. 12, 2000, now issued as U.S. Pat. No. 6,301,296 on Oct. 9, 2001, entitled "Digital Impairment Learning Sequence";

Ser. No. 09/579,529, filed May 26, 2000 entitled "Receiver Codec Super Set Constellation Generator" filed May 26, 2000.

FIELD OF THE INVENTION

The present invention relates generally to an improved technique for generating a constellation for a computer modem. In particular, the present invention is directed to accommodating signal Robbed-Bit Signaling (RBS), programmed attenuation (pad), and Inter-Modulation Distortion (IMD) during a Digital Impairment Sequence (DIL) conducted with V.90 modems or the like, to calculate minimum distance between constellation points, for an acceptable probability of error occurrence. The generated constellation may be re-evaluated for optimization of bit rate.

BACKGROUND OF THE INVENTION

The necessity of digital communication over existing communications networks, such as public switch telephone network (PSTN), has necessitated the use of increasingly complex and efficient modulators/demodulators (modems). Because most communication systems were originally designed as analog systems, conventional modems have always been limited by the necessity of analog capabilities. Consequently, such modems operate as if the entire communications network, is an analog system, even though much of the communication throughout the PSTN is digital in nature.

Such modems are characterized by the use of an analog-to-digital converter (ADC), which is used to digitize analog signals received by the modem for transmission to a digital portion of the PSTN. Unfortunately, normal speech (due to its wide dynamic range) does not lend itself well to efficient linear digital encoding. Two types of quantization systems are used in such modems, "$\mu$-law" and "A-law". Both systems encompass signal compression algorithms to optimize or modify the dynamic range of an analog signal prior to digitization. Both of these systems are used to optimize the PSTN for traditional voice communications. Thus, traditional encoding systems impose significant limitations on data communications.

When a client modem transmits data, it uses a digital-to-analog converter (DAC) such as 15 in FIG. 3, to convert digital signals into analog signals. Eventually, the analog signal is received and converted back to digital form by an analog-to-digital converter (ADC) somewhere in PSTN 40. When the analog signal levels used by the DAC in the client modem do not accurately respond to the quantization intervals used by the receiving ADC, the data transmitted may not be properly converted back into the exact digital form originally sent. If the receiving ADC incorrectly converts an analog signal transmitted, the receiving modem will not receive the same data that was transmitted.

In Prior Art voice communications systems, such conversion errors were not particularly problematic, as such conversions would not produce noticeable artifacts in voice signals. However, in a data communications network, such errors in conversion result in data errors, which may not be acceptable in a data communications system.

In order to avoid such communications errors, certain error-checking protocols may be used. However, such protocols may require retransmission of corrected data, thereby reducing the rate at which data can be transmitted. The result is greatly reduced digital efficiency for PSTN 40 comprising the digital communications system.

Conventional analog modems may use a symbol table containing digital bit patterns, known as a constellation, which corresponds to each signaling level or quantization level. As data is transmitted by the modem, specific bit patterns from the data stream are correlated to different symbols in the table. Each symbol is converted by DAC to transmit a unique analog signal to the analog portion of PSTN 40.

However, in order for accurate communications to take place, the ADC at the receiving modem 30 must convert the analog signals back into the original digital bit pattern. With conventional modems, this is very often not possible unless the system is equipped with substantial error correcting protocols. Thus, the arrangement and characteristics of the constellation determines the permissible transmission rate.

A significant problem with accurate and efficient transmission of digital data over PSTN 40 is the difference between symbol table correlation based upon ideal quantization intervals and the actual optimized quantization intervals appropriate for the real signals received at a modem. This situation creates errors, forcing the transmission rate, or bit rate to be decreased.

This problem has been addressed in part by such systems as that disclosed in Cai et al., U.S. Pat. No. 5,831,561, issued Nov. 3, 1998, and incorporated herein by reference. For a given bit rate, the system of Cai et al. uses a process of dynamically selecting a constellation which is optimized in the sense that distances between adjacent symbols are maximized. This dynamic selection recursively eliminates symbols with the smallest distance to adjacent symbols until the number of symbols left reaches a predetermined value based upon the given bit rate.

Unfortunately, the system of Cai et al. requests that the number of symbols in the constellation be predetermined, and the symbol error probability of the selected constellation cannot be guaranteed. In addition, the transmitting power limit is not being considered. In most circumstances, it may be more desirable to select a constellation which provides maximum bit rate (determined by the number of symbols in the constellation) with the restriction that symbol error probability under certain noise variance is smaller than a predefined value and the transmitting power is smaller than a maximum value. Further, it may also be necessary to re-evaluate the selected constellation to optimize bit rate when the channel condition changes.

SUMMARY OF THE INVENTION

The present invention relates to a technique for generating constellations for a V.90 type modem, the constellations are generated by selecting symbols in the available symbol tables with the constraint that the distance between adjacent selected symbols is greater than a minimum distance $D_{min}$. $D_{min}$ is selected such that the number of symbols in the constellation is maximized with the restriction that the symbol error probability is smaller than a predefined value-under certain noise variance.

In a uniform distance constellation, the symbol error probability is a function of the uniform distance for a given noise variance. Therefore, minimum uniform distance can be calculated by solving this equation. While in a non-uniform distance constellation, such as the constellation used in V.90 type modems, due to the non-linearity of "$\mu$-law", or "A-law" coding, the symbol error probability of the constellation for a given noise variance is a function of multiple arguments, (the distances between adjacent symbols).

All these distances may be determined by $D_{min}$. Theoretically, it is still possible to find the minimum $D_{min}$ by solving the equation using an enumerating method. However, such an approach may require tremendous calculation power. A more practical approach is to approximate this equation by replacing all the distances with $D_{min}$. Basically, such an approach is an attempt to solve the problem with the approach used in a uniform distance constellation.

However, the present inventors have determined that a much more accurate approximation exists, in which the symbol error probability is a function of $D_{min}$ as well as "density ratio" $r=L/M$, where M is the total number of symbols in a constellation and L is the number of symbols where the distance from its neighbors is less than a small multiple of $D_{min}$. Unfortunately, since values of L and M are dependent on $D_{min}$, it may be difficult to determined $D_{min}$ directly from the symbol error probability and noise variance.

Based upon the noise variance and the predefined symbol error probability, a first guess for $D_{min}$ may be used to calculate values L and M. These values may then be plugged back into the equation and a new value for $D_{min}$ may be calculated. The process may be iterated a number of times, although in practice three iterations may be more than sufficient to determine the correct values for $D_{min}$.

Once $D_{min}$ has been calculated, the overall constellation may be determined.

Accordingly, using the present invention, constellations may be generated for each of the six slots of a V.90 frame. The power limit is incorporated into the constellation generation process to guarantee that the average power of the constellations is less than a predefined value. The final constellations may be adjusted to fit the request of the modulus encoder.

The resulting constellation may be optimized for the data channel. In the present invention, optimization may be achieved by incorporating a technique for renegotiating data rate (e.g., constellation) based upon channel conditions. If a certain number of CRC (Cyclic Redundancy Check) errors are detected, it is determined that the data channel is too noisy and the constellation should be downsized. If no errors are detected, or the number of errors detected are less than a minimum value, then it may be determined that a higher bit rate is achievable and a larger constellation may be used. In either instance, the constellation may be again recalculated to optimize data bandwidth.

DETAILED DESCRIPTION OF THE INVENTION

Figure 3:
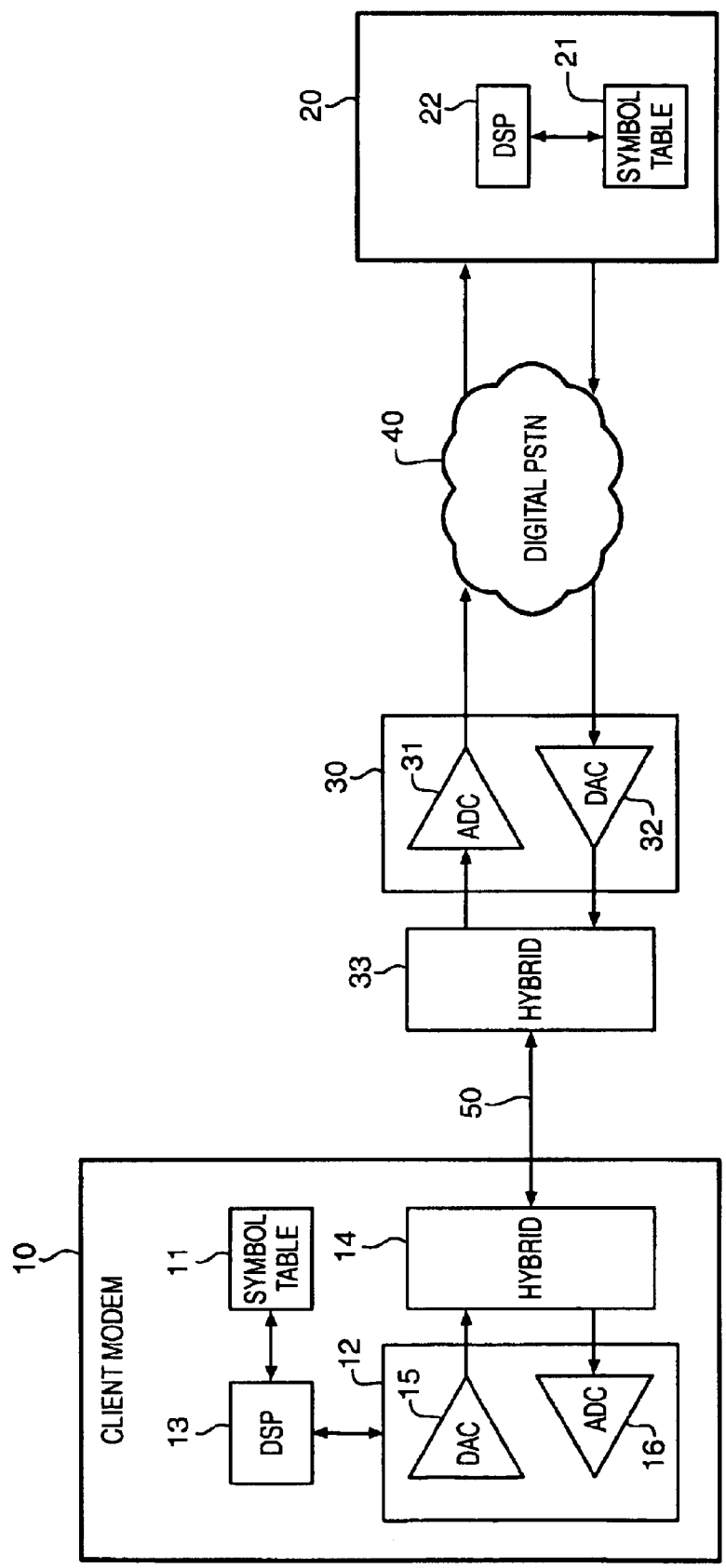
FIG. 3 is a schematic diagram depicting the overall communication system in which the present invention operates.

FIG. 3 depicts a portion of a communications system, which includes a digital public switched telephone network (PSTN) 40. Remote or client modem 10 may communicate with a central office installation 20 through the digital PSTN 40. In order to communicate with the digital portion of PSTN 40, it may be necessary to communicate over an analog link 50. Accordingly, digital information at the client modem 10 may be converted to analog signals, transmitted over analog link 50 (generally designated as a local loop), and transmitted to PSTN interface circuitry 33 and 30. Analog signals may then be converted using analog to digital converter 31, and transmitted into the digital portion of PSTN 40.

All of the elements depicted in FIG. 3 may represent standard components within a typical communications systems. As such, the system depicted in FIG. 3 merely depicts the environment in which the present invention operates. Components such as modem 10, are all part of the present invention and are altered only in terms of the programming provided to DSP 13 and the data found in symbol table 11. The present invention is likewise found in the data exchanged between client modem 10 and server modem 30. Otherwise, the components are typical of those found in conventional systems. Other than the functionality of the present invention, the components depicted in FIG. 3 may be similar to those used in the system of the Cai patent, previously incorporated by reference.

Figure 4:
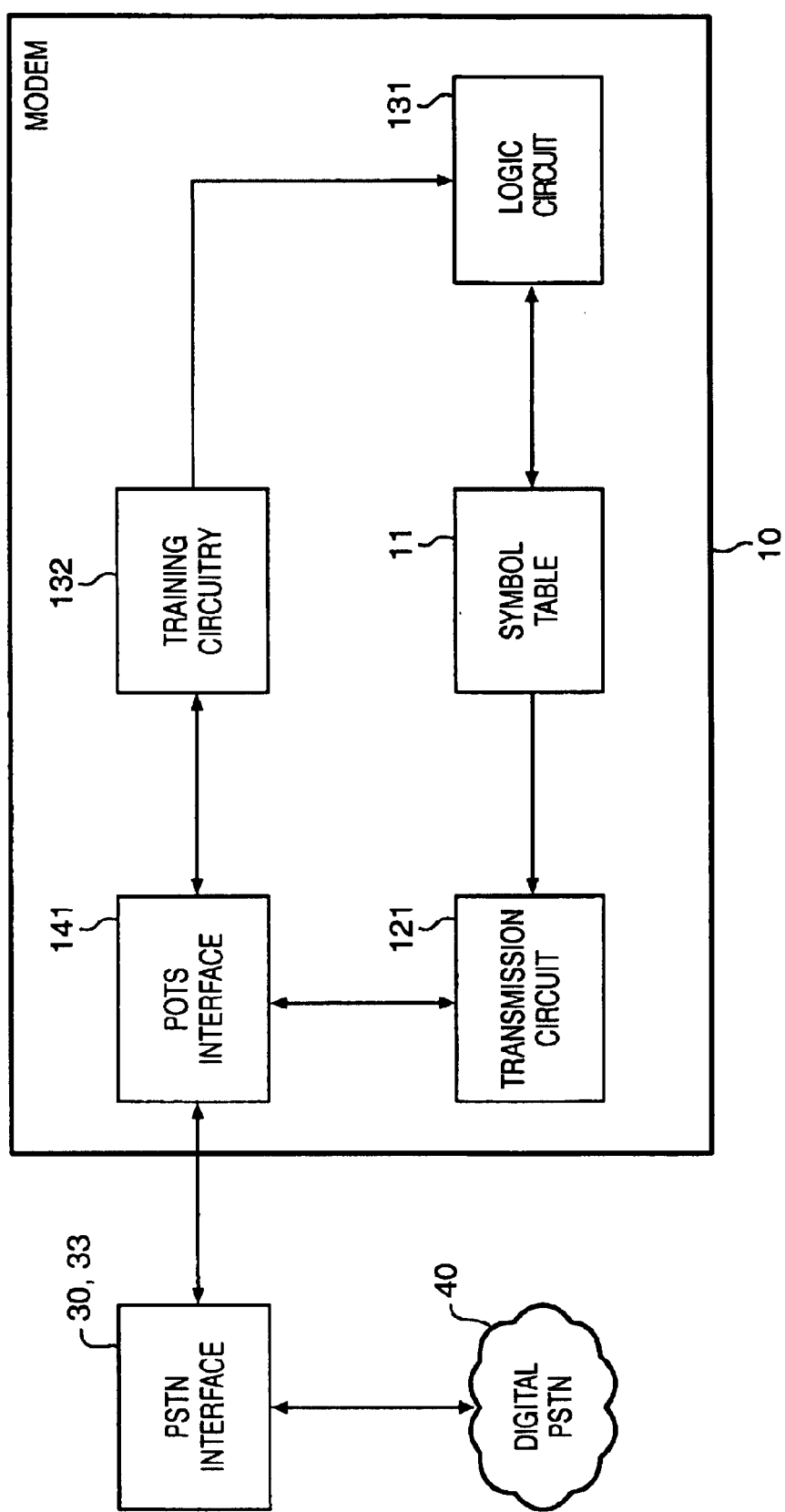
FIG. 4 is a schematic diagram of a modem configured in accordance with the present invention.

FIG. 4 depicts the functional circuitry of a client modem 10 which may be used to carry out the operation of the present invention. It is to be understood that the present invention is not limited to a specific communication device or type of communication device. Rather, the devices depicted in FIGS. 3 and 4 are merely exemplary in nature.

As depicted in FIG. 4, client modem 10 includes a telephone interface 141 for coupling the modem to PSTN 40 and analog interface 30,33. Training circuitry 132 may then determine signal conversion guide values of ADC 21 and DAC 32 within PSTN analog interface 30, 33.

Symbol table 11 may be used to store a constellation of symbols for the upstream and downstream channels. Logic circuit 131 may be used to select optimal constellations in accordance with conventional functionality as well as carrying out the calculations of the present invention which compensate for variations in pad, IMD and RBS.

Such information may be transmitted from client modem 10 to central office 20 via interface circuitry 33, 30 and digital portion of PSTN 40 using transmission circuit 121 operating through telephone interface 141.

Although client modem 10 is depicted as including a number of discrete circuits for each function, it should be recognized that the modem employing the principals of the present invention may be integrated into one or more semiconductor devices without limitation. Examples of such devices are digital signal processors (DSP) such as device 13 in FIG. 3, microprocessors, Applications Specific Integrated Circuits (ASIC) and programmable read-only memories (PROM).

In the present invention, training circuitry 132, or its functional equivalent, may be responsible for sending signaling parameters (such as the designation of the sign and amplitude of the training signals) to server modem 30. In the conventional art, training circuit 132 may also operate to determine signal conversion values for ADC 31 and DAC 32 at server modem 30.

A base constellation stored in symbol table 11 may be accessible for the functionality of training circuit 132, as is the capability of adjusting equalizers (not shown) used in the DAC 15 and ADC 16 of client modem 10. This functionality may be used to carry out the present invention since coefficients have to be developed to operate on received signals to obtain actual readings as opposed to theoretical or idealized values.

The process for generating the data constellation is a multi-step process. From the received training data, a receiver super constellation for each of the six slots is determined with necessary compensation for PAD, RBS, and IMD. This compensation may also be carried out during data transmission. With the help of this compensation, the receiver noise may be assumed to be Additive White Gaussian Noise (AWGN).

The object of constellation generation is to determine the constellation which will offer the highest bit rate under existing current channel conditions, including all operating characteristics such as PAD, RBS, IMD and the like. At the same time the selected constellation must ensure that the symbol error probability is smaller than a particular threshold. Due to the many variations and combinations of digital impairment (PAD, RBS and the like) the conventional methods of using fixed constellation tables for different digital impairments are not appropriate for optimum constellation generation corresponding to specific accuracy levels.

Figure 1:
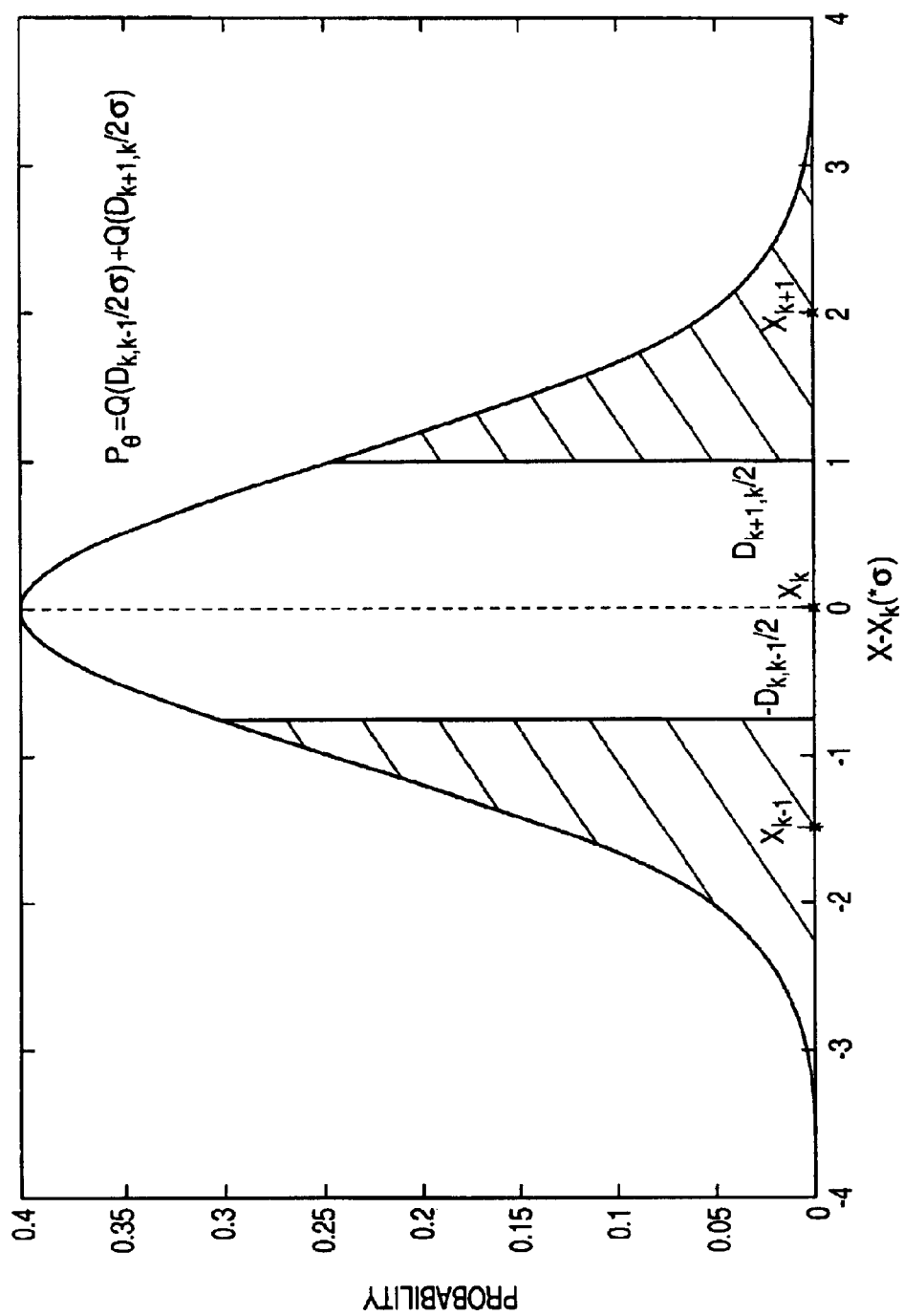
FIG. 1 is a graph depicting a plot between received values and probability of occurrence, following an additive white Gaussian noise curve.

Accordingly, the first embodiment of the present invention is directed to a more generic adaptive constellation generation method. To facilitate the method of the present invention it is assumed that the only distortion left in the equalizer (depicted in FIG. 4) output is Additive White Gaussian Noise (AWGN) as depicted in FIG. 1. Should IMD be present, the generated constellation may be limited to low value segments of G.711 code format such that nonlinear distortion can be ignored. With these basic limitations, it is possible to generate a constellation with an expected symbol error probability for a particular noise variance.

The constellation generation algorithm operates to select symbols from the receiver super constellation such that the distance between adjacent symbols is larger than a value based upon channel conditions and system operating characteristics. This distance may be denoted by $D_{min}$, and is valued to ensure certain symbol error probability. The number of symbols in a constellation should be selected such that the average power of the constellation should not exceed a predetermined value.

With a selected $D_{min}$, a search on the receiver super constellation may be used to generate a constellation for a certain slot. Starting from the symbol with the smallest amplitude, if the distance between the current symbol and the previous selected symbol is greater than $D_{min}$, the current symbol may be selected to be included in the constellation. This search may continue until the average power of the constellation for the slot at issue is larger than the power limit if an additional constellation symbol is provided.

The power limit on each slot is set such that the average power of the current slot and all the previous slots in a frame together is less than a value predefined by the server modem.

The number of symbols in the constellation for each slot may be denoted as $M_0, \ldots, M_5$ and the number of bits used in the modulus encoder may be denoted as K. The desired operation of the present invention should satisfy the following equation:

$$2^k \leq \prod_{i=0}^{5} M_i$$

Usually, the largest K the constellation can support may be selected. If the server or customer disables some rates, K may be the largest one with that constraint.

The incoming K bits to the modulus encoder may be presented as an integer:

$$R_0 = b_0 + b_1 \times 2^1 + b_2 \times 2^2 + \ldots + b_{K-1} \times 2^{K-1}$$

Accordingly, the output $K_0, \ldots, K_5$ will be:

$$K_i = R_i \text{ Modulo } M_i, \text{ where } 0 \leq K_i < M_i; R_{i+1} = (R_i - K_i)/M_i$$

The largest K bits binary number is $2^K - 1$.
Sometimes, $$2^k - 1 < \prod_{i=0}^{4} M_i \times (M_5 - 1)$$

then $K_5 \leq M_5 - 2$.

Accordingly, the index in the last slot will never be $M_5 - 1$. If:

$$2^k \ll \prod_{i=0}^{5} M_i$$

(which may happen if the server or customer disables some rates), $K_5$ might always be zero. This kind of situation may violate the equiprobable assumption on modulus outputs. Another negative effect of this situation is that the power of the last slot may be much higher than the others, because a zero index may correspond to the largest linear value in the constellation.

In order to avoid this situation, the constellations may be adjusted if:

$$2^K - 1 < \prod_{i=0}^{4} M_i \times (M_5 - 1)$$

$M_0, M_1, \ldots, M_5$ may be decreased by same ratio to make the value $$\prod_{i=0}^{5} M_i$$

as close to $2^K$ as possible. Any extra reduction will be done on $M_5$, if needed. The reduction of $M_K$ may eliminate the levels of both the lower end (small amplitude) and high end (large amplitude) of the constellation.

This scheme may be used to compromise between power expenditure and symbol error. Deleting high levels may reduce average power but increase symbol error, as the high levels have larger distances between symbols than low levels. Deleting low levels may have the opposite effect.

As a preliminary operation to practicing the present invention according to the discussion in the previous section, a process is carried out to find the smallest $D_{min}$ which can sustain a specified symbol error probability under the channel condition. Using the aforementioned AWGN assumptions, the resulting symbol error probability is a function of the constellation and the noise variance.

When calculating symbol error probability, it is assumed that there are M symbols in a constellation. The corresponding linear values may then be $X_0, X_1, \ldots, X_{M-1}$. The distance between two adjacent symbols may be denoted as:

$$D_{k,k-1} = X_k - X_{k-1}, \text{ where } k=1, \ldots M-1$$

Denoting the transmitted signal value and the received value as X,X', respectively, and the noise variance as $\sigma^2$, the conditional symbol error probability for given a certain transmitted symbol can be expressed as:

$$P(X' \neq X / X = X_0) = Q\left(\frac{D_{1,0}}{2\sigma}\right)$$

$$P(X' \neq X / X = X_{M-1}) = Q\left(\frac{D_{M-1,M-2}}{2\sigma}\right)$$

$$P(X' \neq X / X = X_k) = Q\left(\frac{D_{k,k-1}}{2\sigma}\right) + Q\left(\frac{D_{k+1,k}}{2\sigma}\right),$$

$$k=1 \ldots M-2$$

where $$Q(x) = \int_x^{+\infty} \frac{1}{\sqrt{2\pi}} \exp\left(-\frac{x^2}{2}\right) dx$$

Assuming equal-probability of each symbol, the symbol error probability is:

$$P_e = \frac{1}{M}\left\{Q\left(\frac{D_{1,0}}{2\sigma}\right) + \left[Q\left(\frac{D_{1,0}}{2\sigma}\right) + Q\left(\frac{D_{2,1}}{2\sigma}\right)\right] + \left[Q\left(\frac{D_{2,1}}{2\sigma}\right) + Q\left(\frac{D_{3,2}}{2\sigma}\right)\right] + \ldots + Q\left(\frac{D_{M-1,M-2}}{2\sigma}\right)\right\}$$

The constellation may be generated with constraint that $D_{k,k-1} \geq D_{min}$, k=1, \ldots, M-1. The result is the following relationship:

$$P_e \leq 2Q\left(\frac{D_{min}}{2\sigma}\right) \quad \text{EQUATION (1)}$$

From Equation (1) it is possible to calculate $D_{min}$ based on the expected symbol error probability $P_e$ and the noise variance. The calculation is performed using the following equation:

$$D_{min} \approx Q^{-1}\left(\frac{P_e}{2}\right) \times 2\sigma \quad \text{EQUATION (2)}$$

In a non-uniform distance constellation, $$Q\left(\frac{D_{k,k-1}}{2\sigma}\right) << Q\left(\frac{D_{min}}{2\sigma}\right),$$

because $D_{k,k-1} >> D_{min}$, when $X_k >> 0$. As a result, the constellation generated with $D_{min}$ from Equation (2) has a symbol error probability much smaller than $P_e$. Accordingly, it is possible to obtain a larger value of M (number of symbols in each constellation) with a smaller $D_{min}$ while still maintaining a symbol error probability smaller than $P_e$. One major contribution of the present invention is a better approximation of the symbol error probability equation, which is elaborated as follows.

Figure 2:
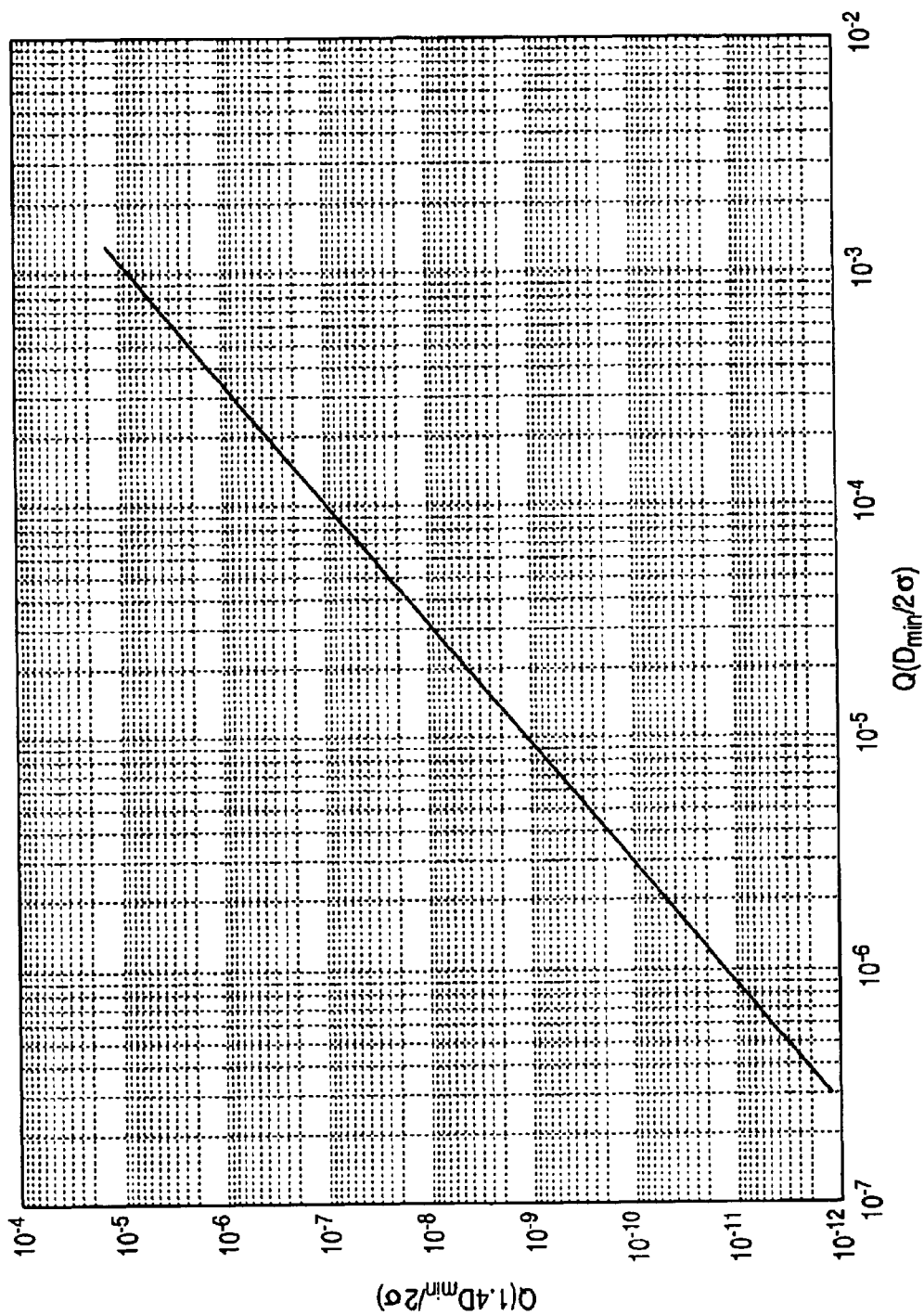
FIG. 2 includes graphs depicting relationships between $Q(D_{min}/2\sigma)$ and $Q(1.4D_{min}/2\sigma)$, which is used in the approximation of the symbol error probability.

One property of the Q function in the interested range may be expressed as follows:

$$\frac{Q\left(\frac{D}{2\sigma}\right)}{Q\left(\frac{D_{min}}{2\sigma}\right)} \leq 0.01,$$

$$D \geq 1.4 D_{min}$$

if $$Q\left(\frac{D_{min}}{2\sigma}\right) \leq 10^{-3}$$

which is depicted in FIG. 2. For example, if $$Q\left(\frac{D_{min}}{2\sigma}\right) = 2 \times 10^{-4}, \quad Q\left(\frac{1.4 D_{min}}{2\sigma}\right) = 3.6 \times 10^{-7}$$

it is safe to ignore any components with $D \geq 1.4 D_{min}$ in the symbol error probability function.

A better approximation can be expressed as:

$$D_{min} = \min(D_{k,k-1}), k=1, \ldots, M-1$$

$$P_e = 2\left(\frac{L}{M}\right)Q\left(\frac{D_{min}}{2\sigma}\right) \quad \text{EQUATION (3)}$$

Where L is the number of levels with $D_{k,k-1} \leq 1.4 D_{min}$, the following relationship results:

$$D_{min} \approx Q^{-1}\left(\frac{M}{2L} \times P_e\right) \times 2\sigma \quad \text{EQUATION (4)}$$

In order to use equation (4) to calculate $D_{min}$, it may be necessary to known the "density ratio" L/M which can only be known after the constellation is generated. An iterative method may be used to obtain the values of L and M. The initial value of L/M may be set to 1, 51 in FIG. 5, and Equation (4) may be used to calculate a $D_{min}$ 52. After a constellation is generated with the calculated $D_{min}$ 53, a new estimate of L/M, may be obtained. This value may then be used in the next iteration 54. This iterative process may be completed when certain criteria are met 55.

Figure 5:
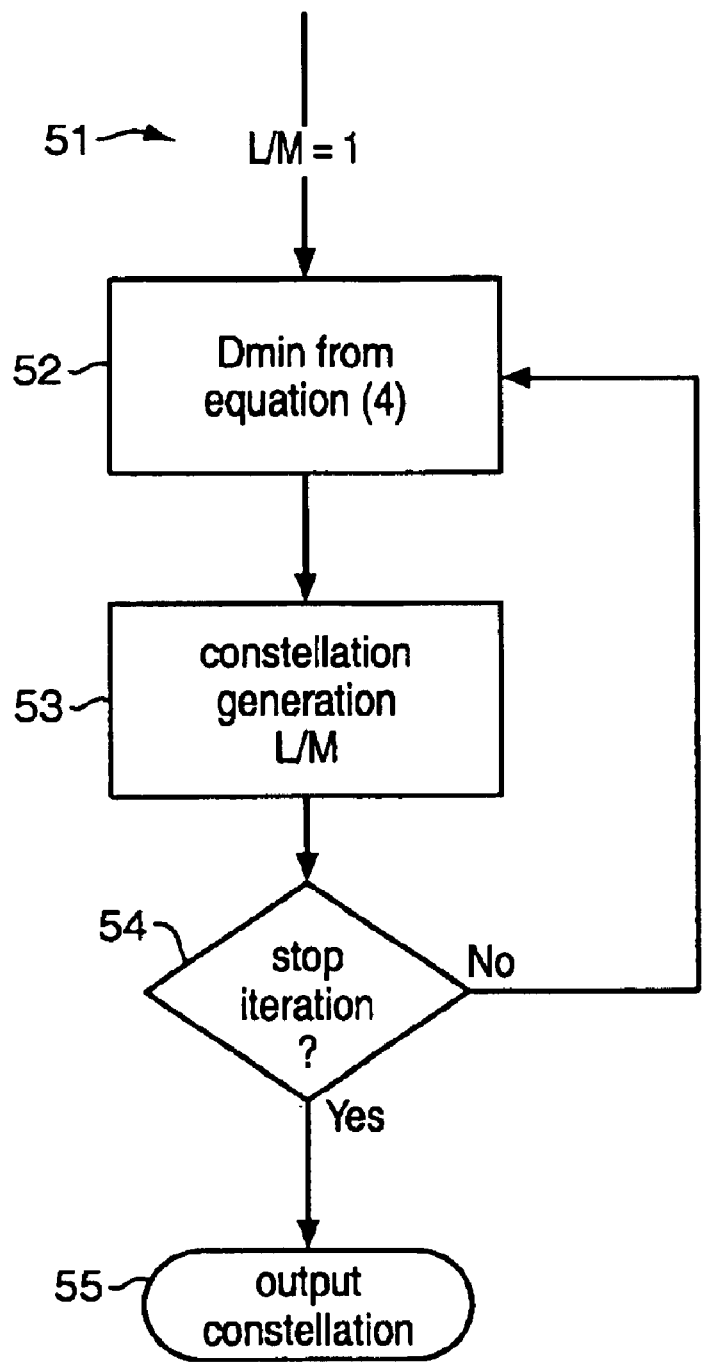
FIG. 5 is a flow diagram depicting the iterative process of minimum distance calculation.

FIG. 5 depicts the aforementioned operation of $D_{min}$ calculation. Experiments show that three iterations are good enough to obtain an accurate $D_{min}$.

In the aforementioned algorithm, the noise variance and the expected symbol error are necessary to practice the process. The average power of equalizer error will be used to estimate the noise variance. In order to minimize the effect of IMD and the decision error, only the center symbols of the constellation are used to estimate noise variance. Depending upon the availability of error correction protocols, the expected symbol error probability may be selected accordingly. Experiments show that a symbol error probability of $2 \times 10^{-4}$ for a connection with the V.42 protocol and a symbol error probability of $3 \times 10^{-6}$ for a connection without the V.42 protocol will give the best throughput.

The aforementioned algorithm assumes that the noise is AWGN. However, in some cases, that assumption might not be valid. For example, uncancelled IMD may introduce non-Gaussian noise. Therefore, it may be necessary to re-evaluate the constellation to make sure the symbol error probability restriction is met. Also, as channel conditions may change over time, it may be necessary to adjust the constellation based upon the new channel condition to achieve the same symbol error probability.

When some error detection protocol, such as V.42, is available, the number of Cyclic Redundancy Code (CRC) errors within a certain time period (for example, every $2^{16}$ symbols) is a good indication of bit error probability (or symbol error probability). If the number of CRC errors exceeds a predetermined threshold determined by the expected symbol error probability, it indicates that the present constellation cannot sustain the symbol error probability restriction, either because the channel noise increased or the channel model used is not correct or accurate enough.

In both cases, a coarser constellation (with a bigger $D_{min}$) may be generated and a rate renegotiation may be conducted between the two modems. If the number of CRC errors is smaller than another predetermined threshold (smaller than the first one to provide some allowance), it indicates that the symbol error probability is smaller than the expected value, and a denser constellation (with a smaller $D_{min}$) might be used to offer higher bit rates and satisfy the symbol error probability restriction at the same time. A new noise estimation may be conducted and the constellation generation algorithm may be used to generate a new noise constellation based upon the new noise variance estimation. If the new constellation offers a higher bit rate, a rate renegotiation may be conducted between the two modems.

The aforementioned constellation re-evaluation method may employ a "rate-up" monitor based upon noise variation estimation and the constellation generation algorithm as well as a "rate-down" monitor based upon a symbol error probability check. The system can adapt to channel changes and provide optimum throughput. However, if the constellation generation algorithm fails to generate a constellation with a symbol error probability smaller than the expected value due to mismatch between the channel model used and the real channel, the "rate-up" monitor and the "rate-down" monitor may disagree with each other. The "rate-up" monitor may try to keep using a denser constellation based upon noise estimation, whereas the "rate-down" monitor may keep trying to use a coarser constellation because it finds the symbol error probability higher than expected. As a result, a "ping-pong" mode may be entered, and throughput may be reduced, as time is wasted when excessive rate renegotiation occurs between the two modems.

In order to solve this problem, the inventors have designed three criteria for the constellation re-evaluation method, which are elaborated upon below.

Whenever the constellation is changed to a coarser one by the "rate-down" monitor, the symbol error probability restriction used in the constellation generation algorithm may be tightened. Thus, the constellation generated may have more allowance in symbol error probability to sustain the symbol error probability restriction imposed by the "rate-down" monitor.

Whenever a "ping-pong" mode is entered, the denser constellation involved may be marked unavailable to the constellation generation algorithm, because a "ping-pong" mode clearly indicates the failure of the constellation generation algorithm to guarantee the symbol error probability restriction. As a result, the "rate-up" monitor will not be able to ask for the denser constellation anymore, and the "ping-pong" situation is cleared.

Whenever a constellation is used and sustains the symbol error probability restriction imposed by the "rate-down" monitor for certain period, and the constellation is even denser than the previously marked unavailable constellations, these unavailable constellations may be re-marked as available. The rational behind this procedure is that an even denser constellation may satisfy the symbol error probability restriction, indicating the channel condition may have improved significantly. The knowledge gathered before, such as the observation that the constellation generation algorithm fails under the previous channel condition, may thus not be valid anymore.

In the present invention, further optimization of the constellation may be provided by calculating the effects on the symbols received by client modem 10 caused by such system characteristics as PAD, Third-Order IMD and RBS. These calculations may be performed before constellation generation.

Details of such calculations are described in the following, commonly owned co-pending U.S. Patent Applications: Digital Impairment Learning Sequence, Ser. No. 09/592,539 filed Jun. 12, 2000, now U.S. Pat. No. 6,301,296 issued Oct. 9, 2001; Pad Detection, Ser. No. 09/598,934 filed Jun. 22, 2000 and, Inter Modulation Distortion Detection, Ser. No. 09/598,680 filed Jun. 21, 2000. The subject matter of all of these applications is incorporated herein by reference. It should be noted that the present invention can be practiced without the techniques of the three aforementioned patent applications. However, constellation generation is optimized through the use of these techniques.

Although a number of embodiments of the present invention have been presented by way of example, the present invention should not be construed to be limited thereby. Rather, the present invention should be interpreted to encompass any and all variations, permutations, modifications, adaptations, embodiments and derivations that would occur to one skilled in this art, having been taught the present invention by the instant application. Accordingly, the present invention should be construed as being limited only by the following claims.

We claim:

1. A client modem operatively connected to a server modem through a communications system, said client modem including means for generating data constellations from non-uniform spaced super constellations for exchange of symbols between said client modem and said server modem based upon signals having a bit rate and received from said server modem at said client modem, said means for generating constellations comprising:

means for approximating symbol error probability function of a data constellation for an observed noise variance by a function of the ratio between the minimum distance between adjacent symbols in the data constellation and the observed noise variance, multiplied by a density ratio of the data constellation, means for estimating a first minimum distance between adjacent symbols in the data constellation based upon expected symbol error probability selected according to the retransmission overhead of different operation modes;

means for calculating a first density ratio of data constellation based upon said first minimum distance; and means for directing iterative recalculations of additional density ratios of data constellation and minimum distances between adjacent symbols in the data constellation until a final minimum distance is found that satisfies predetermined system requirements.

2. The client modem of claim 1, wherein said density ratio of data constellation is expressed as:

L/M, where M is the number of symbols in the data constellation, and L is the number of symbols in the data constellation in for which the distance from adjacent symbols is less than a certain value.

3. The client modem of claim 1, wherein said means for generating data constellations further comprises:

means for deleting symbols from the data constellation to satisfy the equal-probability requirement of modulus encoder.

4. The client modem of claim 1, wherein said expected symbol error probability is selected as $2 \times 10^{-4}$ for the connections that support automatic recovery based on physical layer error control protocol and $3 \times 10^{-6}$ for the connections that operate in a transparent mode.

5. The client modem of claim 1, wherein said means for generating data constellations further comprises:

means for monitoring symbol error rate in the signals having a bit rate;

means for comparing the monitored symbol error rate with a first predetermined threshold and a second predetermined threshold, determined by the expected symbol error probability; and means for adjusting said bit rate and said final minimum distance between adjacent symbols in the data constellation if the monitored symbol error rate exceeds the first predetermined threshold or the monitored symbol error rate is smaller than the second predetermined threshold.

6. The client modem of claim 5, wherein said means for monitoring symbol error rate comprises:

means for calculating symbol error rate from cyclic redundancy check (CRC) error rate;

means for calculating symbol error rate from the observed noise variance and the minimum distance between the adjacent symbols in the data constellation.

7. The client modem of claim 5, wherein said means for adjusting comprises:

means for generating a constellation from the non-uniform spaced super constellations having a higher final minimum distance between adjacent symbols in the data constellation if the monitored symbol error rate exceeds the first predetermined threshold; and means for generating a constellation from the non-uniform spaced super constellations having a lower final minimum distance between adjacent symbols in the data constellation if the monitored symbol error rate is smaller than the second predetermined threshold.

8. The client modem of claim 5, wherein said means for adjusting further comprises:

means for reducing the said expected symbol error probability if said means for comparing the monitored symbol error rate with a first predetermined threshold determined by expected symbol error probability determines the symbol error rate exceeds the first predetermined threshold.

9. The client modem of claim 5, wherein said means for adjusting further comprises:

means for disabling a denser constellation selection for said means for generating a constellation from the non-uniform spaced super constellations having a lower final minimum distance between adjacent symbols in the data constellation, if the data constellation has been regenerated more than a predetermined number of times during a predetermined time period.

10. The client modem of claim 9 wherein said means for adjusting further comprises:

means for enabling a previously disabled constellation selection, if an even denser data constellation than the disabled constellation produces a symbol error rate less than the first predetermined threshold.

11. A method of operating a first modem operatively connected to a second modem through a communications system by generating a data constellation of data points for exchange of symbols between said first modem and said second modem, said method comprising:

selecting a probability of error acceptable for communications between said first modem and said second modem;

estimating a first minimum distance between adjacent symbols in the data constellation based upon said selected probability of error;

calculating a first ratio of data constellation symbol numbers based upon said first minimum distance between adjacent symbols in the data constellation;

calculating a second minimum distance between adjacent symbols in the data constellation based upon said first ratio of data constellation symbol numbers; and calculating additional minimum distances between adjacent symbols in the data constellation and ratios of data constellation symbol numbers until a final minimum distance between adjacent symbols in the data constellation is determined, satisfying system requirements.

12. The method of claim 11, wherein said final minimum distance between adjacent symbols in the data constellation is obtained after calculating two previous minimum distances between adjacent symbols in the data constellation.

13. The method of claim 11, wherein said ratio of data constellation symbol numbers is expressed as:

L/M, where M is the number of symbols in the data constellation, and L is the number of symbols in the data constellation in for which the distance from adjacent symbols is less than a certain value.

14. The method of claim 12, wherein an intermediate data constellation is generated for each new value of minimum distance between adjacent symbols in the data constellation, and a final data constellation is generated upon obtaining said final minimum distance between adjacent symbols in the data constellation.

15. The method of claim 11, wherein said final data constellation generation further comprises:

deleting symbols from the data constellation to satisfy the equal-probability requirement of modulus encoder.

16. The method of claim 11, wherein said expected symbol error probability is selected as $2 \times 10^{-4}$ for the connections that support automatic recovery based on physical layer error control protocol and $3 \times 10^{-6}$ for the connections that operate in transparent mode.

17. The method of claim 14, further comprising:

monitoring the symbol error rate; and adjusting said bit rate and said final minimum distance between adjacent symbols in the data constellation responsive to said symbol error rate.

18. The method of claim 17, wherein monitoring symbol error rate comprises:

calculating symbol error rate from cyclic redundancy check (CRC) error rate or from an observed noise variance and the minimum distance between adjacent symbols in the data constellation, and comparing the monitored symbol error rate with a first predetermined threshold and a second predetermined threshold, determined by expected symbol error probability; and wherein adjusting said bit rate and said final minimum distance between data constellation data points responsive to said symbol error rate comprises:

adjusting said bit rate and the final minimum distance between data constellation data points if the monitored symbol error rate exceeds the first predetermined threshold or the monitored symbol error rate is smaller than the second predetermined threshold.

19. The method of claim 18, wherein adjusting comprises:

generating a constellation from the non-uniform spaced super constellations having a higher final minimum distance between adjacent symbols in the data constellation if the monitored symbol error rate exceeds the first predetermined threshold; and generating a constellation from the non-uniform spaced super constellations having a lower final minimum distance between adjacent symbols in the data constellation if the monitored symbol error rate is less than the second predetermined threshold.

20. The method of claim 18, wherein adjusting further comprises:

reducing the said expected symbol error probability if comparing the monitored symbol error rate with a first predetermined threshold determined by expected symbol error probability indicates that the symbol error rate exceeds the first predetermined threshold.

21. The method of claim 18, wherein adjusting further comprises:

disabling a denser constellation selection for generating a constellation from the non-uniform spaced super constellations having a lower final minimum distance between adjacent symbols in the data constellation, if the data constellation has been regenerated more than a predetermined number of times during a predetermined time period.

22. The method of claim 18, wherein adjusting further comprises:

enabling a previously disabled constellation selection, if an even denser data constellation than the disable constellation produces a symbol error rate less than the first predetermined threshold.

23. The method of claim 18, wherein calculating symbol error rate occurs for every $2^{16}$ symbols transmitted from said second modem to said first modem.

24. The method of claim 11, further comprising correcting signals received at said first modem from said second modem to compensate for any of preprogrammed attenuation (pad), Inter Modulation Distortion (IMD), and robbed-bit signaling (RBS).

25. A client modem comprising:

a telephone interface to couple the client modem to a communication channel;

a symbol table to store a constellation of signals for the communication channel; and a logic circuit to select constellations and to perform calculations;

wherein the client modem is to generate data constellations from non-uniform spaced super constellations for exchange of symbols between the client modem and a server modem based upon signals having a bit rate and received from the server modem at the client modem, generating constellations comprising:

approximating symbol error probability function of a data constellation for an observed noise variance by a function of the ratio between the minimum distance between adjacent symbols in the data constellation and the observed noise variance, multiplied by a density ratio of the data constellation, estimating a first minimum distance between adjacent symbols in the data constellation based upon expected symbol error probability selected according to the retransmission overhead of different operation modes;

calculating a first density ratio of data constellation based upon the first minimum distance; and directing iterative recalculations of additional density ratios of data constellation and minimum distances between adjacent symbols in the data constellation until a final minimum distance is found that satisfies predetermined system requirements.

26. The client modem of claim 25, wherein the density ratio of data constellation is expressed as:

L/M, where M is the number of symbols in the data constellation and L is the number of symbols in the data constellation in for which the distance from adjacent symbols is less than a certain value.

27. The client modem of claim 25, wherein generating data constellations further comprises:

deleting symbols from the data constellation to satisfy an equal-probability requirement of a modulus encoder.

28. The client modem of claim 25, wherein the expected symbol error probability is $2 \times 10^{-4}$ for the connections that support automatic recovery based on physical layer error control protocol and $3 \times 10^{-6}$ for the connections that operate in a transparent mode.

29. The client modem of claim 25, wherein generating data constellations further comprises:

monitoring symbol error rate in the signals having a bit rate;

comparing the monitored symbol error rate with a first predetermined threshold and a second predetermined threshold, determined by the expected symbol error probability; and adjusting the bit rate and the final minimum distance between adjacent symbols in the data constellation if the monitored symbol error rate exceeds the first predetermined threshold or the monitored symbol error rate is smaller than the second predetermined threshold.

30. The client modem of claim 29, wherein monitoring symbol error rate comprises:

calculating symbol error rate from cyclic redundancy check (CRC) error rate;

calculating symbol error rate from the observed noise variance and the minimum distance between the adjacent symbols in the data constellation.

31. The client modem of claim 29, wherein adjusting comprises:

generating a constellation from the non-uniform spaced super constellations having a higher final minimum distance between adjacent symbols in the data constellation if the monitored symbol error rate exceeds the first predetermined threshold; and generating a constellation from the non-uniform spaced super constellations having a lower final minimum distance between adjacent symbols in the data constellation if the monitored symbol error rate is smaller than the second predetermined threshold.

32. The client modem of claim 29, wherein adjusting further comprises:

reducing the expected symbol error probability if comparing the monitored symbol error rate with a first predetermined threshold determined by expected symbol error probability determines the symbol error rate exceeds the first predetermined threshold.

33. The client modem of claim 29, wherein adjusting further comprises:

disabling a denser constellation selection for the generation of a constellation from the non-uniform spaced super constellations having a lower final minimum distance between adjacent symbols in the data constellation, if the data constellation has been regenerated more than a predetermined number of times during a predetermined time period.

34. The client modem of claim 33, wherein adjusting further comprises:

enabling a previously disabled constellation selection, if an even denser data constellation than the disabled constellation produces a symbol error rate less than the first predetermined threshold.

* * * * *